United States Patent [19]

Cheng et al.

[11] Patent Number: 5,174,928
[45] Date of Patent: Dec. 29, 1992

[54] GAS AND LIQUID CONTACTING PROCESS

[75] Inventors: Chen-Yen Cheng; Wu-Cheh Cheng, both of Albuquerque, N. Mex.

[73] Assignee: Silk Partnership, Albuquerque, N. Mex.

[21] Appl. No.: 472,752

[22] Filed: Jan. 31, 1990

[51] Int. Cl.⁵ .............................................. B01F 3/04
[52] U.S. Cl. .............................. 261/128; 261/112.2; 261/153; 165/115; 165/174
[58] Field of Search ............... 261/153, 112.2, 128; 165/115, 174, 173, 175, 170

[56] References Cited

U.S. PATENT DOCUMENTS

| | | | |
|---|---|---|---|
| 1,834,604 | 12/1931 | Dalgliesh | 165/174 |
| 1,855,817 | 4/1932 | Beauchamp et al. | 165/115 |
| 1,943,855 | 1/1934 | Carter | 165/115 |
| 2,310,121 | 2/1943 | Scherer | 261/153 |
| 3,249,155 | 5/1966 | Huet | 261/112.2 |
| 3,995,689 | 12/1976 | Cates | 261/155 |
| 4,098,331 | 7/1978 | Ford et al. | 165/174 |
| 4,296,050 | 10/1981 | Meier | 261/112.2 |
| 4,434,112 | 2/1984 | Pollock | 261/153 |
| 4,566,290 | 1/1986 | Otterbein | 261/153 |

FOREIGN PATENT DOCUMENTS 2459437 2/1987 France ............................. 261/153
641260 1/1979 U.S.S.R. ............................. 261/153

Primary Examiner—Tim Miles

[57] ABSTRACT

The structure, method of fabrication and uses of enclosed double plate heat transfer panels with prefabricated main panel bodies are introduced. In most applications, a pane is used to conduct a gas-liquid interaction such as vaporization, condesation, gas absorption, gas description, endothermic and exothermic chemical reactions inside while having a heat interaction with a fluid outside that undergoes a complementary operation. A panel (41) incorporates one or more of the following key features:

(a) It comprises a prefabricated main body (42) and two reinforced mainfold conduits (47) and (49) welded to the main panel body by welds (45).
(b) It has nozzles (48) for applying a liquid film inside the panel.
(c) The inside surfaces (51) are textured to improve wettability and drainage.

7 Claims, 7 Drawing Sheets

GAS AND LIQUID CONTACTING PROCESS

BACKGROUND OF THE INVENTION

1. Field of Invention

The present invention relates to the structure, method of fabrication and uses of heat transfer panels with prefabricated main panel bodies and reinforced manifold conduits. It is related in general to heat transfer equipment and is particularly related to enclosed double plate heat transfer panels. A panel is used to conduct a gas-liquid interaction in an internal fluid or fluids inside the panel and to have heat interaction with an external fluid that undergoes a complementary operation. The fluid(s) inside may undergo vaporization, condensation, gas absorption, gas desorption, exothermic and endothermic chemical reactions and simple fluid heating and cooling; the fluid outside may undergo vaporization, condensation, desublimation, gas absorption, gas desorption, exothermic and endothermic chemical reactions and simple fluid heating and cooling. The present invention is therefore generally related to gas-liquid interactions and associated heat transfer operations.

2. Brief Description of the Prior Art

There are two major types of enclosed double plate heat transfer panels commercially available. These are (a) inflated double plate panels and (b) stamped double plate panels.

An inflated double plate panel is made by placing two rectangular sheets of metal together, welding the two sheets together by spot welding in some staggered pattern, seam welding the four edges to form an assembly, providing an opening and inflating the assembly to form multitudes of pillows. Internal manifold conduits are provided for feeding and discharge by properly arranging the welding pattern. Companies in the U.S. that manufacture inflated heat transfer panels are Mueller Co. in Springfield, Mo., Turbo in Denton, Tex., and Rosenblad in Princeton, N.J.

A stamped enclosed double plate heat transfer panel is made from two sheets of metal, A-sheet and B-sheet. At least one sheet, say A-sheet, is stamped by a large hydraulic press to form an array of strips of high and low regions. The entire sheet is either formed in a single operation or in a few operations by using a set of rather big stamping dies. The stamped plate is also provided with formed edges. When the two sheets are welded together, a unitary assembly with strips of welds, a set of processing conduits are two internal manifold conduits is formed. The internal manifold conduits are made from the two sheets of metal by proper edge forming and proper welding operations. Companies in the United States of America that produce stamped enclosed heat transfer panels are Tranter Co. of Wichita Falls, Tex., Dean Products, Inc. of Brooklyn, N.Y. and Entex, Inc. of Iowa Park, Tex..

Some key features of conventional heat transfer panels are summarized as follows:

(1) There is no conventional panel that provide means for applying liquid film on the inside surface of the panel.
(2) There is no conventional panel that has textures on the inside surface to enhance wettability and drainage and thereby enhance heat and mass transfer rates.
(3) There are inherent weak spots near the intersections of manifold conduits and processing conduits.

BRIEF DESCRIPTION OF THE INVENTION

The present invention relates to the structures, method of fabrication and uses of high performance enclosed double plate heat transfer panels. In most applications, a panel of the present invention, designated as a PRE-FAB panel, is used to conduct an interaction between a gas phase mass and a liquid phase mass inside the panel. Such an operation is simply referred to as a gas-liquid interaction. Such an interaction also requires a heat interaction such as heat addition or heat removal. The heat interaction is done with a fluid outside of the panel, which undergoes a complementary operation to absorb the interaction. Gas-liquid interactions requiring heat inputs are (a) vaporization, (b) desorption and (c) endothermic chemical reactions; gas-liquid interactions requiring heat removal are (a) condensation, (b) absorption and (c) exothermic chemical reactions. A PRE-FAB panel can be operated to provide a large gas-liquid interface area inside and provide enhanced heat and mass transfer rates. It is noted that in some gas-liquid interactions, such as condensation, a liquid film is generated on the inner surface of the panel; in most other cases, a liquid film has to be applied on the inner surface of the panel. It is also noted that a PRE-FAB panel may be used to form a jacketed vessel and several panels may be assembled into a bank of panels.

A PRE-FAB panel incorporates one or more of the following features:

(1) A PRE-FAB panel may comprise a prefabricated main panel body, a reinforced feed manifold conduit and a reinforced discharge manifold conduit. The main body has an array of alternately contact strips and a multitude of processing conduits. The reinforced manifold conduits may either be reinforced internal conduits or strong external conduits.
(2) Means of applying liquid may be provided to apply a liquid film on the inside surface of each processing conduit of the main panel body.
(3) When a panel is used with applied liquid film, the inner surface of each processing conduit may be textured in one of many ways to improve wettability, and to provide mini-agitation to thereby improve heat and mass transfer rates.
(4) When the interaction in a PRE-FAB panel generates a liquid film, such as in a condensation operation, the inner surface of each processing conduit may be fluted to enhance draining of the liquid and thereby improve the heat and mass transfer rates.
(5) A pre-fabricated main panel body may be used to form a jacketed vessel. A manufacturer may supply prefabricated main panel bodies to local fabricators which transform them into jacketed vessels.

The fluid outside of a panel may undergo an operation such as (a) vaporization, (b) condensation, (c) desublimation, (d) humidification such as evaporative cooling (e) absorption, (f) desorption, (g) endothermic chemical reaction, (h) exothermic chemical reaction, (i) simple fluid heating, or (j) simple fluid cooling either to supply heat to or remove heat from the fluid inside of the panel.

The uses of PRE-FAB panels of the present invention has many advantages such as (1) only a few types of prefabricated main panels have to be produced and they can be mass produced by highly automated operations, (2) external manifold conduits of various diameters, proper strength and proper sizes of perforations can be readily produced, (3) customers' needs can be readily filled by bonding properly selected external manifold conduits to proper main bodies, (4) a very small inventory is needed to meet market needs, (5) heat and mass transfer rates are greatly enhanced.

BRIEF DESCRIPTION OF DRAWINGS

In most cases, a PRE-FAB panel is rectangular and has four edges. The first and second edges are in the direction perpendicular to the processing conduits and are the edges along which external manifold conduits are bonded on. The remaining edges are referred to the third edge and fourth edge. These two edges have to be sealed. FIGS. 19 and 19a illustrates another way of sealing the edges.

FIGS. 22a and 22b show cross sections of a double stamped plate Type A panel and single stamped plate Type A panel in the direction perpendicular to the direction of the processing conduits.

PREFERRED EMBODIMENT OF THE INVENTION

The present invention relates to the structures, method of fabrication and uses of new enclosed double plate heat transfer panels, referred to as PRE-FAB panels. In most applications, some kind of gas-liquid interactions take place within the panels and heat interactions take place between the fluids inside and the fluids outside the panels. The major objectives of the invention are (1) to adopt a prefabrication approach to the industry, (2) to increase the strength of a panel, (3) to increase heat and mass transfer rates, and (4) to provide heat transfer panels with large processing conduits.

Figure 1:
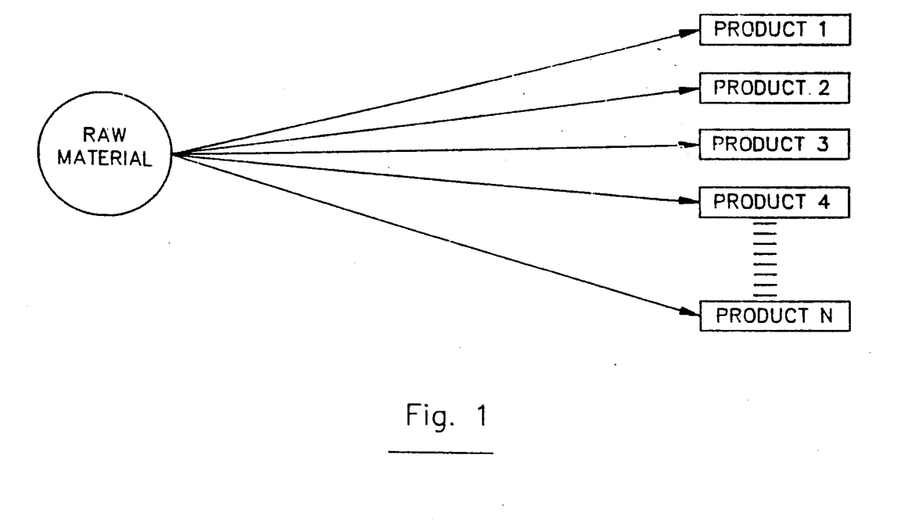
FIG. 1 illustrates the conventional approach in producing enclosed double plate heat transfer panels.

FIG. 1 illustrates the conventional approach for producing enclosed double plate heat transfer panels. A conventional panel is made of two sheets of metal, at least one sheet is formed into a shape that has a main region and edge regions, the main region having alternate strips of high regions and low regions and some of the edge regions being formed into manifold conduit shapes. When the two sheets are bonded together, they become a unitary assembly having multitude of processing conduits in the main region and two or more internal manifold conduits at some edges of the panel. Therefore, a specific die is needed to form metal sheets for each type of panel. A conventional panel manufacturer either has to keep a large inventory for various types of panels or has to take a long lead time in meeting customers' needs.

Figure 2:
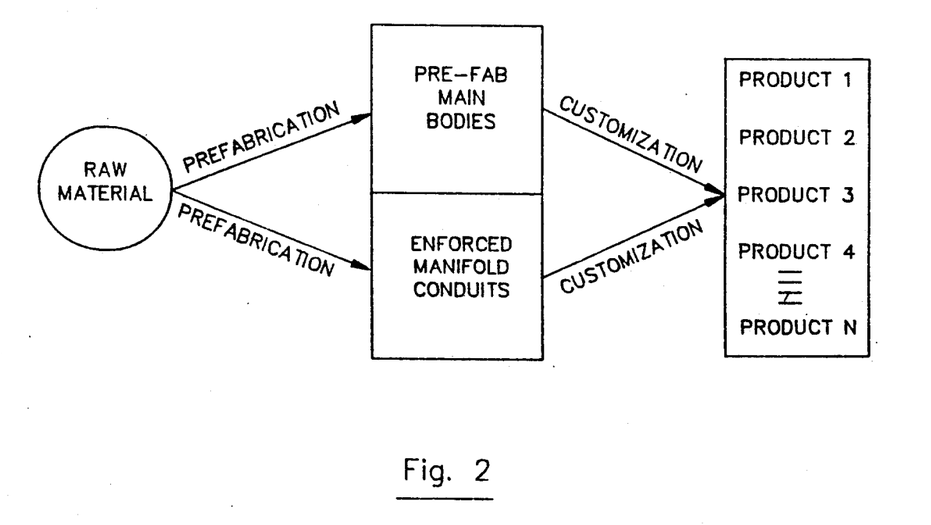
FIG. 2 illustrates the present PRE-FAB approach in producing heat transfer panels. Together, the two figures illustrate the advantages of the PRE-FAB approach.

FIG. 2 illustrates the PRE-FAB Panel approach of the present invention. According to this new approach, panel production process comprises a first step of producing a few types of prefabricated main panel bodies (PRE-FAB main bodies) a second step of producing a few types of reinforced manifold conduits and a third step of bonding proper enforced manifold conduits to an appropriate prefabricated main panel body. Only a few types of prefabricated main panel bodies are produced in a large quantity by a highly automated production method and are stocked as intermediate products. Then, the need of a customer is readily met by bonding proper enforced manifold conduits to an appropriate main panel body. The PRE-FAB Panel Approach greatly reduces the inventory of a manufacturer and greatly reduces the lead time needed to meet the need of a customer. The PRE-FAB Panel Approach enables a manufacturer to produce many types of panels by matching a few types of external manifold conduits with a few types of main bodies.

Figures 3, 4, 7, 8:
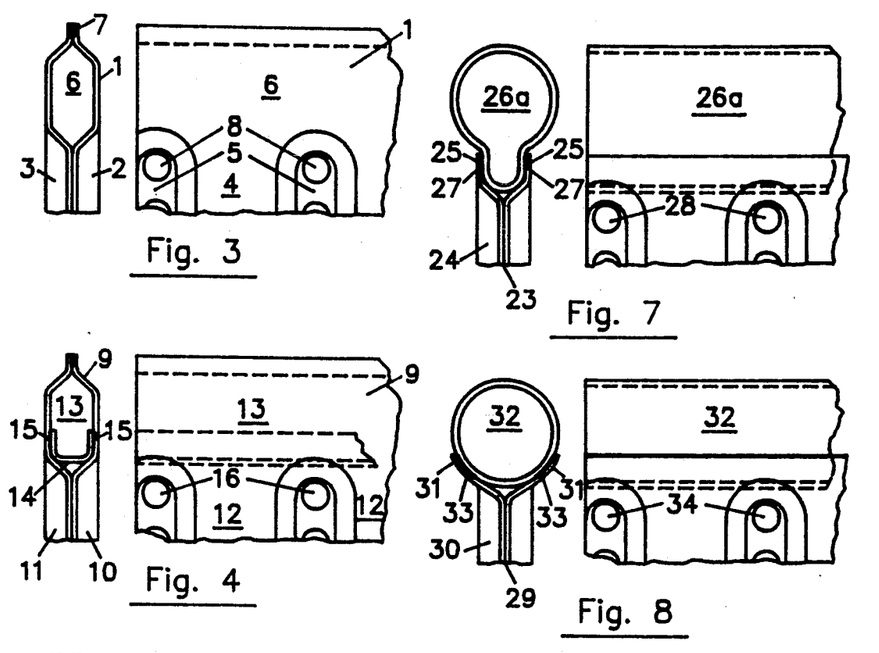
FIGS. 3 through 10 illustrate various ways of constructing enclosed double plate heat transfer panels, various ways of constructing external manifold conduits and various ways of bonding the external manifold conduits to prefabricated main panel bodies.

FIG. 3 illustrates the structure of a conventional panel. The panel 1 comprises two sheets of metal 2,3 each sheet being formed by a stamping operation to have an array of alternate strips of high regions 4 and low regions 5 in the main part of the sheet and manifold conduit region 6 along a first edge and a second edge of the sheet. When two sheets are brought together and bonded together by welding the low region 5 and along the two edges 7 of the sheets, a unitary assembly is formed. A multitude of processes' conduits are formed in the main part and two manifold conduits are formed along the first and second edges. A panel is completed by sealing the remaining two edges. It is noted that two edge region of each sheet are formed and bonded to form the manifold conduits: Therefore, these conduits are referred to as internal manifold conduits. The thickness of the metal in the edge regions is the same as the metal in the main part of the panel. The first welds 8 that are the welds that are closest to the intersection regions between the processing conduits and the manifold conduits are inherently weak spots of a conventional panel. In order to overcome this inherent weakness problem, a sheet of metal of a thickness greater than the thickness needed to sustain the pressure in the main body is used. This is a major disadvantage of the conventional panels.

In a panel of the present invention, some kind of enforcement is used to overcome the inherent weakness problem. Several ways of enforcement are illustrated in FIGS. 4 through 10. One may use a stress member inside of a internal manifold conduit; one may use a strong channel to form a manifold conduit. One may bond external manifold conduits of proper strength to be welded to a main panel body. It is noted that in a panel of the present invention, the metal sheet used only has to be of a thickness needed to sustain the operating pressure for the main part of the panel. A substantial saving in material can therefore be realized. It will also be noted that some of the methods used in providing enforced manifold conduits work very well with the PRE-FAB Panel Approach described.

FIG. 4 illustrates a panel 9 with internal manifold conduits and a tension or stress member in each manifold conduit. It comprises two sheets of metal 10 and 11 formed and bonded by procedures described by referring to FIG. 3. It therefore has a multitude of processing conduits 12 and internal manifold conduits 13. There is a tension or stress member 14 bonded by welds 15, holding the two sheets of metal together along with manifold conduits to thereby reinforce the otherwise inherently weak welds 16. The thickness of metal used in fabricating panel illustrated by FIG. 4 can be thinner than that used in fabricating a panel illustrated by FIG. 3, when both are used for the same internal pressure. The stress members are provided with perforations to distribute fluid flow and collect fluid into the manifold conduits.

Panels illustrated by FIGS. 5-10 all use prefabricated main panel bodies (PRE-FAB main bodies) and external manifold conduits. Therefore, the structure of a PRE-FAB main body is explained to avoid repetition. A PRE-FAB body is made of two sheets of metal, A-sheet and B-sheet. At least one sheet, say A-sheet, is formed to form an array of alternate strips of high regions and low regions. There are a first edge and a second edge along the direction perpendicular to the strips and there are a third edge and fourth edge along the direction parallel to the direction of the strips. The first and second edges are not formed into manifold conduit form, but rather are formed into short flat flanges or notched to accept external manifold conduits or channels. Therefore, the panel formed from the metal sheets do not have internal manifold conduits. The third edge and fourth edge have to be welded shut to pressure-isolate the inside of the panel from the outside.

Figure 5:
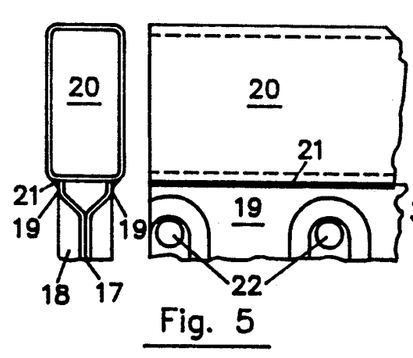

FIG. 5 illustrates a panel 17 with a PRE-FAB main body 18 with short flat flanges 19 along the first edge and second edge and two external rectangular manifold conduits 20 bonded to the flat flanges by welds 21. The rectangular conduits reinforce the inherently weak spots 22. The rectangular conduits may be replaced by conduits of various shapes provided with flat regions for welding to the short flat flanges of the main body.

Figure 6:
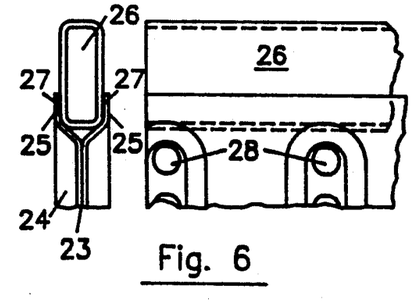

FIG. 6 illustrates a panel 23 with a PRE-FAB main body 24 with flat flanges 25 along the first edge and a second edge and two rectangular manifold conduits 26 with proper perforations fitted within the space between the two flanges and bonded to the flanges with welds 27. The rectangular conduits reinforce the inherent weak spots 28.

FIG. 7 illustrates a panel that is similar to the panel illustrated by FIG. 6, except that external manifold conduits 26a have special shape to have a larger cross-sectional area and yet having a narrow section to fit in the space between the two flat flanges.

FIG. 8 illustrates a panel 29 that has a PRE-FAB main body 30 with the first edge and second edge flared into a circular shaped edges 31 and two manifold conduits 32. The conduits are bonded to the main body by welds 33. The conduits 32 and the welds 33 reinforce the inherent weak spots 34.

Figure 9:
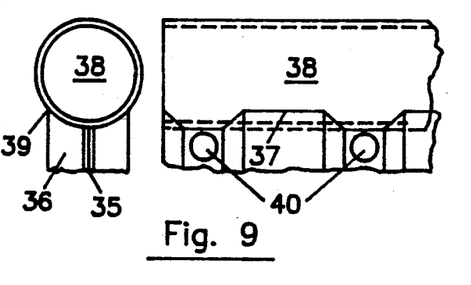

FIG. 9 illustrates a panel 35 with a PRE-FAB main body 36 with notched flanges 37 along the first edge and the second edge. The notched flanges are properly shaped to accept circular manifold conduits 38 tightly and are welded to them by welds 39. The main body of this panel can be made by forming sheets of metal with an array of high and low regions, notching the first and second edges and bonding two sheets together. The welds between the manifold conduits and the main body are not straight welds but follow a notched pattern. The welding can be accomplished by using a robot. The circular conduits and the welds reinforce the inherent weak spots 40.

Figure 10:
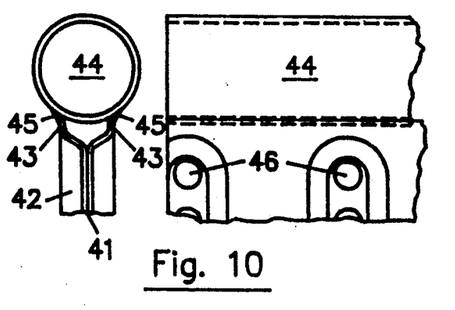

FIG. 10 illustrates a panel 41 with a PRE-FAB main body 42 with short flat flanges 43 along the first edge and the second edge and two circular manifold conduits 44 welded to the main body by welds 45. The external conduits 44 and the welds 45 reinforce the inherently weak spots 46.

Figure 11A:
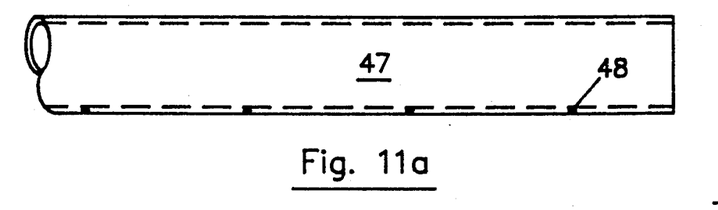
FIG. 11a and 11b illustrate the structure of an external manifold conduit with small spray openings for applying thin liquid film on the inside surface of processing conduits of a PRE-FAB panel and how it is bonded to a main panel body.
Figure 11B:
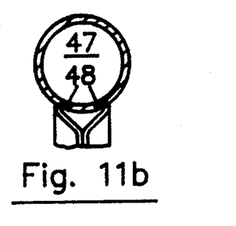
Figures 12A, 12B:
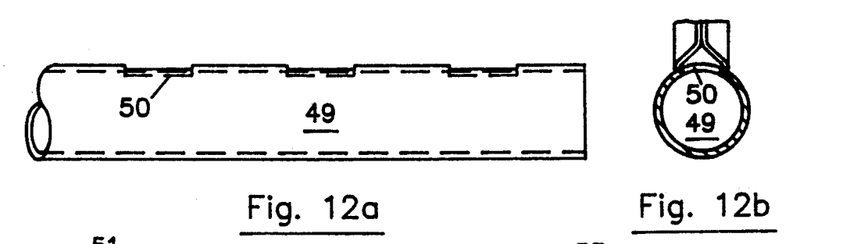
FIGS. 12a and 12b illustrate the structure of an external manifold conduit with large opening and how it is bonded to a main panel body. This type of conduits are used in introducing a vapor or liquid stream into and collecting a liquid stream or a liquid-vapor mixture from a main panel body.

The main body of a heat transfer panel has a multitude of parallel processing conduits. In applying a liquid film to the inside surface of the panel, liquid has to be distributed to each processing conduit and for each side, Sheet-A side and Sheet-B side, at nearly the same flow rates. One may use small holes or a overflow weir to distribute the fluid. FIG. 11a and 11b illustrate a longitudinal cross-section and a transverse cross section of a Type-A external manifold conduit 47 provided with spraying holes 48. In use, a fluid passes through the conduit and the holes to apply small liquid streams to both sides of all the processing conduits. The hole size may be in the range of 0.010 inch to 0.050 inch. The holes can be provided by using a laser unit, an EDM unit or a simple drill. Relatively small spray holes are used to have a high pressure drop across the holes as compared with the pressure drop along the conduit in order to obtain a uniform fluid distribution. FIG. 12a and 12b illustrate a longitudinal and transverse cross-section of a Type B external manifold conduit provided with large holes 50. A Type B conduit is used to introduce a vapor stream, or a flooding flow of liquid into a panel, and to discharge a vapor stream or a mixed liquid vapor stream from a panel.

Another key feature of the present invention is related to formation of liquid film on the inside surface of a panel. A proper formation of liquid film is important in providing a large gas-liquid interfacial area and in reducing heat transfer resistance. There are two types of liquid film formation: viz. the application type and the generation type. In an application type, such as in vaporization, a layer of liquid is sprayed on the inner surface of a panel; in a generation type, such as in condensation, a vapor stream is introduced into a panel and heat is removed from it to thereby generate a liquid film. A proper film formation is accomplished by properly coordinating the gas-liquid interaction conducted in a panel, the way of applying liquid and the way of texturing the inner surface.

In using heat transfer panels, some gas-liquid interactions take place inside, some operations also take place outside and heat interactions take place across the panels. These are explained in detail as follows:

(1) Operations that can be conducted inside panels

In most application, some kind of gas-liquid interactions take place inside of the panels resulting in heat effects such as heat absorptions or heat releases. Interactions requiring heat absorptions are (a) vaporization, (b) gas desorption, and (c) endothermic chemical reactions; interactions resulting in heat releases are (d) condensation, (e) gas absorption and (f) exothermic chemical reactions. One may also conduct a gas-solid interaction such as desublimation and a simple heating and cooling of fluids inside the panel.

(2) Operations that can be Conducted Outside Panels

Some operations take place within the fluid outside of a panel to absorb or release heat in coordination with the heat effect that takes place in the inside fluid. Operations in the outside fluids resulting in heat absorptions are (a) vaporization, (b) humidification such as evaporative cooling, (c) desorption, (d) endothermic chemical reactions, (e) sublimation and (f) simple fluid heating; operations in the outside fluids resulting in heat releases are (g) condensation, (h) desublimation, (i) absorption, (j) exothermic chemical reactions and (k) simple fluid cooling.

(3) Interactions Between the inside and outside zones

The heat effects resulting from operations taking place inside and outside of a panel are compensated by heat transfer across the panel wall. The heat has to transfer through the inner fluid, the wall, and the outer fluid.

In order to enhance the rate of a given gas-liquid interaction in the inside fluid, it is essential to provide a large gas-liquid interfacial area, reduce the heat transfer resistance between the two zones and enhance mass transfer in the gas-liquid interaction. Formation of a liquid film accomplishes the desired effect.

An application type liquid film formation is used for vaporization, gas absorption, gas desorption, conducting chemical reactions involving a gas phase and a liquid phase. An application type liquid film formation is accomplished by (a) a liquid application step, such as spraying and (b) by wetting the plate surface. Wetting of the plate surface is enhanced by a proper texturing of the plate surface. Surface texturing can be accomplished by a blasting operation, such as sand blasting and bead blasting, by an abrasion operation or by scratching, rolling and knurling operation.

Figure 13:
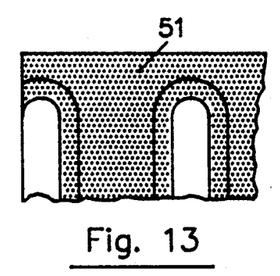
FIGS. 13, 14, and 15 show various ways of texturing the inner surfaces of processing conduits of PRE-FAB panels when liquid films are applied in the panels. The texturing may be accomplished by sand blasting, bead blasting rolling, knurling etc.
Figure 14:
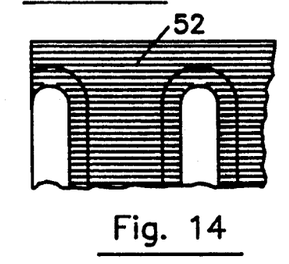
Figure 15:
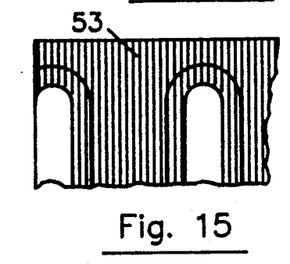

FIGS. 13, 14, and 15 illustrate the inside surfaces of processing conduits with surface textures. FIG. 13 illustrates surface textures 51 provided by a bead blasting operation or by a sand blasting operation. FIG. 14 illustrates a panel with mini-grooves 52 in the direction perpendicular to the direction of the processing conduits; FIG. 15 illustrates a panel with mini-grooves 53 in the direction parallel to the direction of the processing conduits. Liquid distribution rings may be placed at the top of each processing conduit to obtain a more uniform liquid distribution.

A generation type film formation is encountered in condensation and some kind of chemical reaction resulting in formation of a liquid phase. A proper texturing of the surface greatly improves heat transfer rate. A description of enhanced condensing surfaces is given in the following references:

"Handbook of Evaporative Technology," by Paul E. Milton, Noyes Publication, 1986, pages 24-25.

According to the reference, various devices have been used to improve condensing heat transfer by taking advantage of the surface tension forces exhibited by the condensate. One such device is the fluted condensing surface, first presented by Gregorig. The fluted condensing surface has a profile similar to that shown in FIG. 16. Surface tension of the curved liquid-vapor interface produces a large excess pressure in the condensate film adjacent to the crests 54 of the flutes. This causes a thinning of the film in that region, resulting in very high local heat transfer. The surface tension mechanism causes the condensate to accumulate in the troughs 55. Condensate is removed by flowing vertically downward in the troughs. Enough condensate accumulates in the troughs within a short distance from the top of the tube to make heat transfer in the troughs negligible. Thus, heat transfer, averaged around the circumference of the tube, is essentially independent of the tube length as long as the troughs are not flooded.

Although only a portion of the tube surface is available for condensation, the means heat-transfer coefficient over the total surface is 5 to 10 times that of a smooth tube of equivalent length. Heat transfer on a fluted tube approaches that of dropwise condensation. The flute profile is determined by the properties of the condensate. Fluids with lower surface tensions require flutes with a more pronounced curvature. The trough geometry is also determined by the amount of fluid to be removed and the fluid properties.

Fluted surfaces can also be designed for horizontal applications. However, this application has not been as extensively tested as have flutes for vertical tubes. Roped or swaged tubes are also used.

Figures 16, 17, 18, 18A:
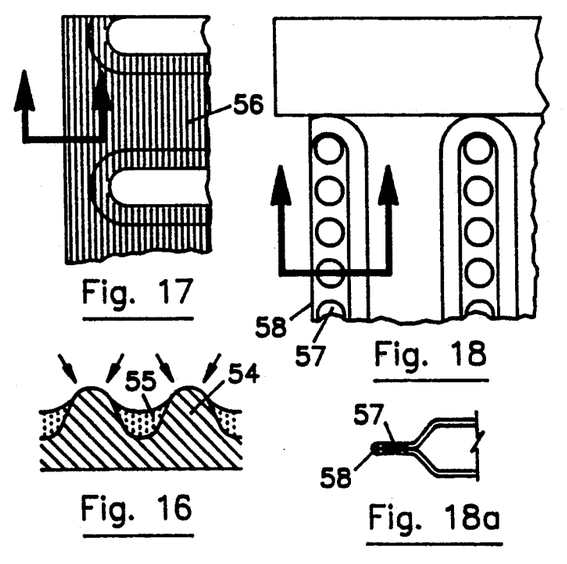
FIG. 16 illustrates the principle of fluting the surface of panel to increase heat and mass transfer rates when liquid film is generated by condensation or by a chemical reaction.
FIG. 17 illustrate the inner surface of a processing conduit on which flute grooves have been applied.
FIGS. 18 and 18a illustrates one way of sealing the edges.

FIG. 17 illustrates a PRE-FAB panel with horizontal processing conduits. The inner surface is provided with fluted textures 56 to improve heat transfer rates by taking advantage of the surface tension effect explained above.

It is noted that texturing of a PRE-FAB panel can be easily done by texturing the two sheets of metal before they are bonded together to become a panel.

Figure 19A:
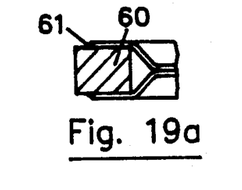

FIGS. 18, 18a, 19 and 19a, illustrate ways of sealing the third edge and fourth edge of a PRE-FAB main body. Referring to FIGS. 18 and 18a, the panel may be cut at the edge of a groove. The groove region is spot welded 57 and the free edge 58 is welded to seal the panel. Referring to FIGS. 19 and 19a, the main body is cut at the midpoint of the high region 59, where a channel, a tube or a flat bar 60 is inserted and welded 61 to seal the panel.

Figures 20, 20A, 20B, 20C, 20D:
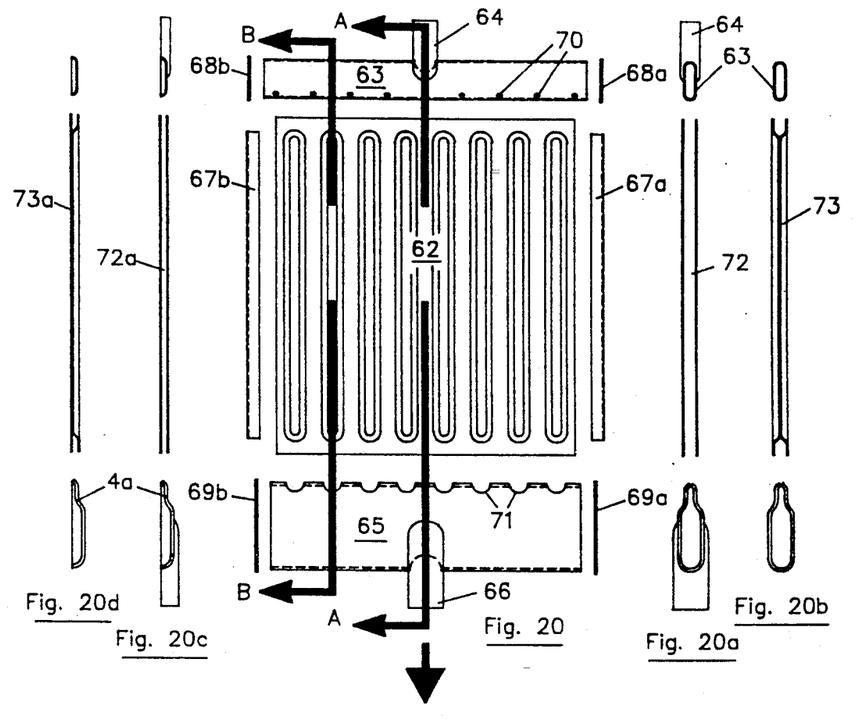
FIGS. 20 and 21 illustrate the structure and method of fabrication of a Type A PRE-FAB panel A Type A panel is used when liquid film is applied to the inner surface of each processing conduit.
Figures 21, 21A, 21B, 21C, 21D:
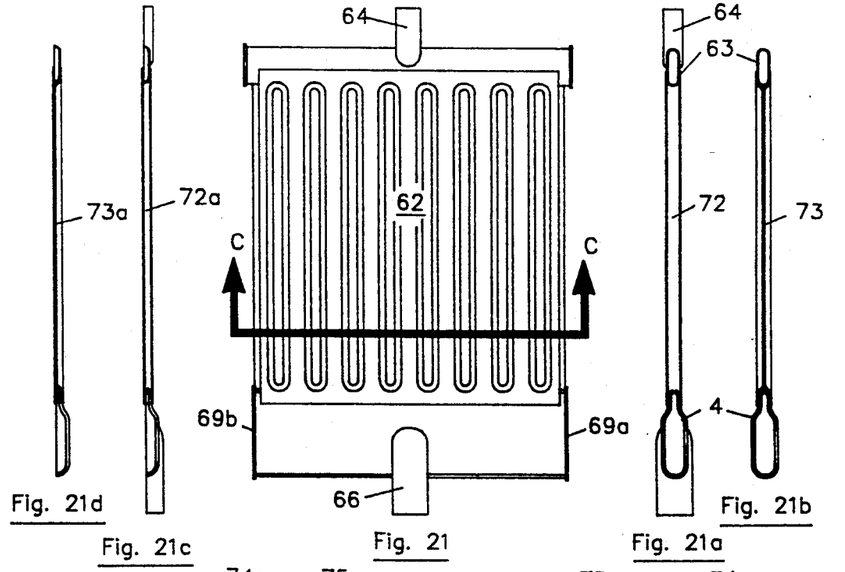

FIGS. 20 and 21 illustrate the structure and method of fabricating a type A panel of the present invention. This panel is used in an application in which a liquid film has to be formed inside of the panel. The operation, taking place in the panel may be (a) vaporization, (b) gas absorption, (c) gas desorption, (d) chemical reactions involving gas and liquid phases. FIG. 20 shows the parts used that are arranged in expanded positions prior to being put together; FIG. 21 shows the final panel after the parts being put together. Referring to the figures, the panel comprises a PRE-FAB main body 62, an external feed manifold conduit 63, a feeding tube to the panel 64, and external discharge manifold conduit 65, a discharge tube from the panel 66, two edge bars 67a and 67b, two edge sealing plates 68a and 68b, two more edge sealing plates 69a and 69b, small perforations 70 provided on the feeding manifold conduit 63 to distribute liquid into the processing conduits and large openings 71 provided on the discharge manifold conduit 65 for collecting liquid, vapor, or liquid-vapor mixture from the processing conduits.

A Type A panel may be a double stamped plate panel or single stamped plate panel. In a double stamped panel, the main panel body is made of two sheets of metal, both are stamped to have an array of alternate strips of high regions and low regions. The two sheets are placed together back to back and the low regions are welded together. A cross-section of the panels taken at A—A and B—B before being bonded together are respectively shown as 72 and 73 in FIGS. 20a and 20b. Cross-sections of the panel after the panels are bonded together at A—A and B—B are respectively shown as 72 and 73 in FIG. 21a and 21b. In a single stamped panel, the PRE-FAB main body is made of one sheet of formed plate and one flat sheet. The formed sheet is stamped to form an array of alternate strips of high regions and low regions. The low regions of the stamped plate is welded to the flat plate to form the main panel body. The manifold conduits are only half in thickness compared with those of the double stamped plate panel. Cross-sections of the parts taken at A—A and B—B before being bonded are shown in FIGS. 20c and 20d; cross-sections of the bonded panel taken at A—A and B—B are shown in FIGS. 21c and 21d, respectively. Cross-sections of the double stamped plate panel and single stamped plate panel taken at positions C—C are respectively shown as FIGS. 22a and 22b. An alternate array of processing conduits 74,74a and bonded strips 75, 75a are shown in each of these figures.

Figure 23:
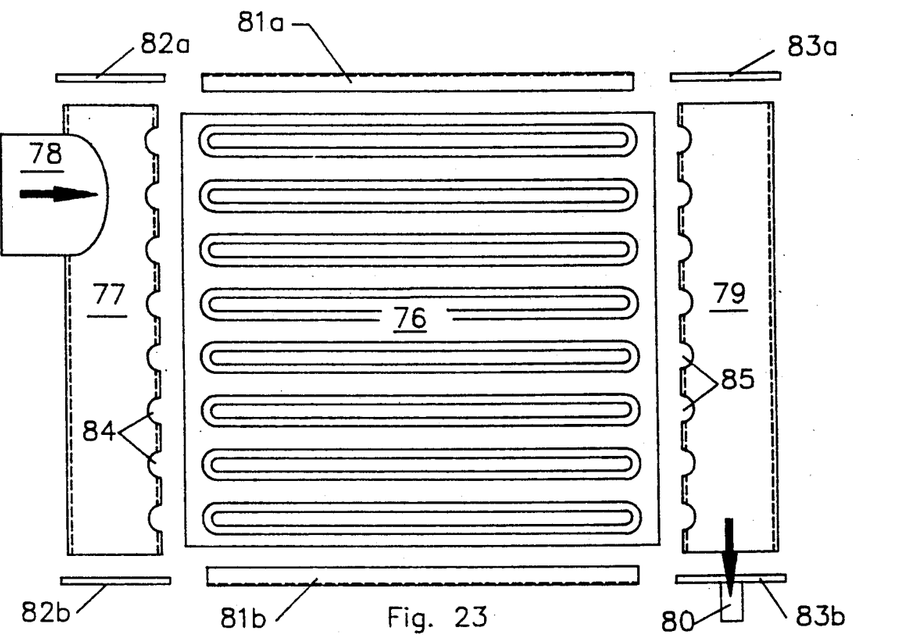
FIGS. 23 and 24 illustrate the structure and method of fabrication of a Type B PRE-FAB panel. A Type B panel is used when liquid film is generated by condensation or chemical reaction on the inner surface of each processing conduit.
Figure 24:
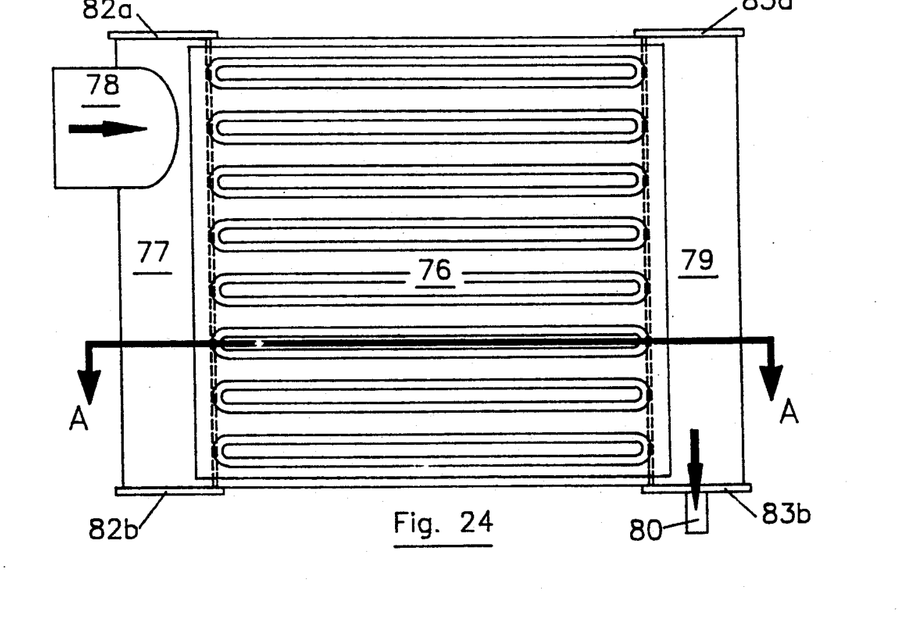

FIG. 23 and 24 illustrate the structure and method of fabricating a Type B panel of the present invention. The panel is used in an application in which a liquid film is generated inside of the panel. The operation taking place in the panel may be (a) condensation and (b) chemical reaction which form liquid phase mass from a gas stream. FIG. 23 shows the part used that are arranged in expanded positions prior to being put together; FIG. 24 shows the final panel after the parts are put together. Referring to the figures, the panel comprises a prefabricated main panel body 76, an external feed manifold conduit 77, a feeding tube to the panel, 78 an external discharge manifold conduit 79, a discharge tube from the panel 80, two edge bars 81a and 81b, two sealing plates 82a and 82b, two more edge sealing plates 83a, 83b, large openings 84 provided on the feeding manifold conduit to distribute vapor feed into the processing conduits and openings, 85 provide in the discharge manifold conduits for collecting liquid product from the processing conduits.

Figure 24A:
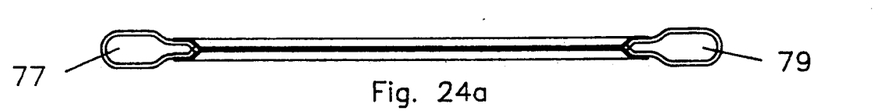

A Type B panel can also either be a single stamped panel or a double stamped panel. A cross-section taken at position A—A of FIG. 24 is shown as FIG. 24a.

Figure 25:
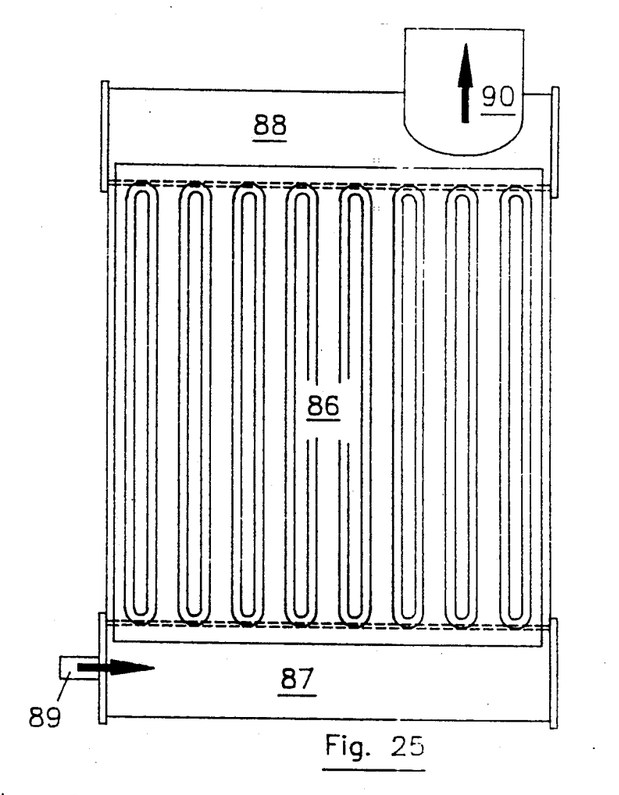
FIG. 25 illustrates the structure and method of fabrication of a Type C PRE-FAB panel. A Type C panel can also be used when liquid film is generated in the processing conduit. A Type C panel can also be used when a liquid is subjected to pool vaporization.

FIG. 25 illustrates the structure and method of fabrication of a Type C panel of the present invention. This type of panel is used in an application in which a liquid is introduced from the bottom of the panel and the liquid boils within the panel. The panel comprises a PRE-FAB main body 86, and external feed conduit 87, an external discharge conduit 88, a liquid feed line 89 and a vapor discharge line 90. The part arrangement and fabrication method are similar to those described in connection with Type A and Type B panels.

Figure 26:
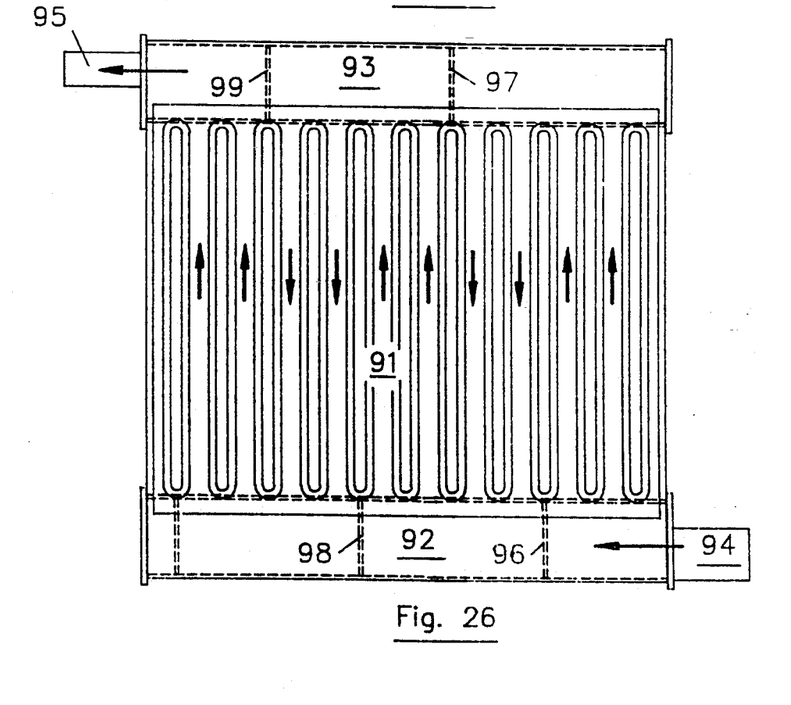
FIG. 26 illustrate the structure and method of fabrication of a Type D PRE-FAB panel. A Type D panel can be used when the inside fluid is subjected to simple fluid heating or fluid cooling operation.

FIG. 26 illustrates the structure of a Type D PRE-FAB panel. This type of panel is used to simply heat or cool a fluid inside the panel. The panel comprises a PRE-FAB main body 91, a first external manifold conduit 92, a second manifold conduit 93, a feed line 94, and a discharge line 95. Baffles 96,97,98, and 99 are provided in the manifold conduits to direct the flow of fluid inside the panel.

Figure 27:
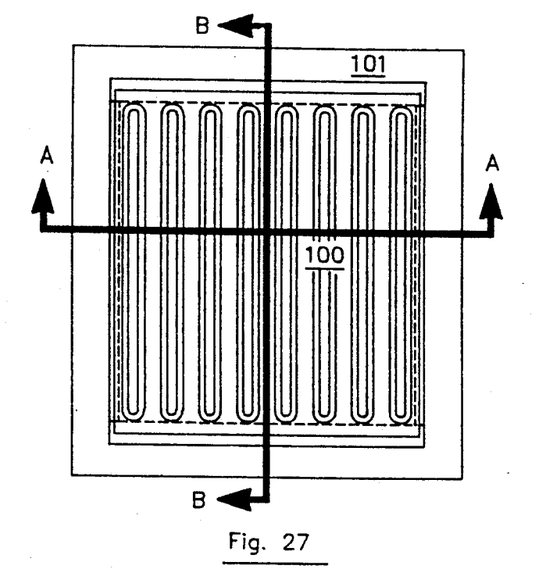
FIGS. 27, 27a, and 27b illustrate the structure of a single stamped PRE-FAB main panel body. It is noted that only one sheet is stamped and the flat sheet is larger than the stamped sheet.
Figures 27A, 28, 29:
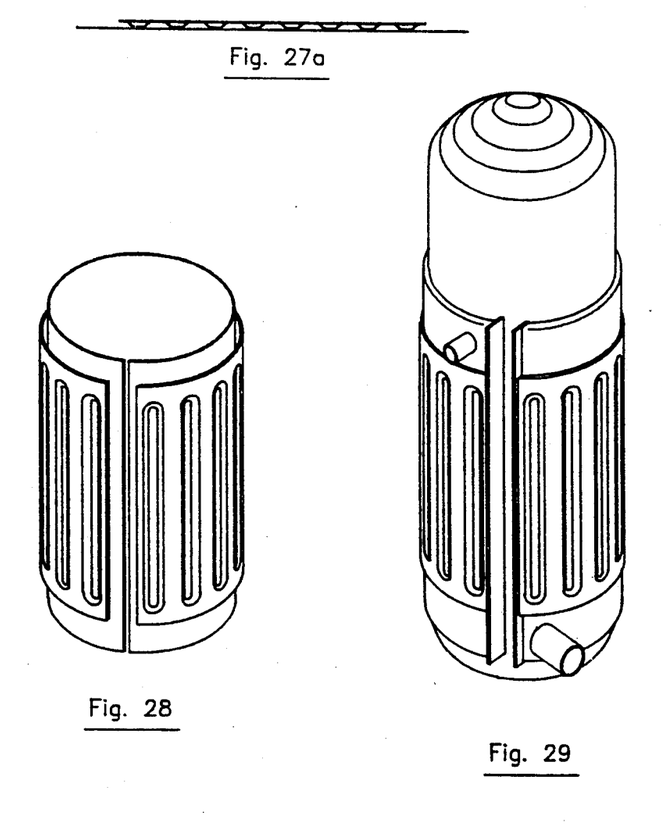
FIGS. 28 and 29 illustrate jacketed vessels made of prefabricated single stamped main panel bodies.
Figure 27B:
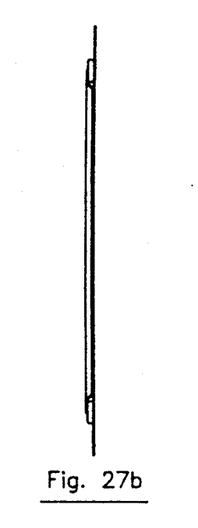

FIG. 27 illustrates a Type E PRE-FAB panel. This type of panel is used to construct a jacketed vessel. It is a single stamped panel and comprises a sheet of stamped metal 100, a flat sheet 101, and a feed conduit and a discharge conduit. FIG. 27a and 27b respectively show cross-sections of the panel taken at position A—A and B—B of FIG. 27. FIG. 28 illustrate a partial assembly of a jacketed vessel made from a PRE-FAB panel; FIG. 29 illustrates a tall jacketed vessel made from a PRE-FAB panel.

What we claim as our invention are as follows;

1. A process of conducting a gas-liquid interaction with a heat effect in a first mass of fluid that comprises one or more fluid streams in a first processing zone under a first pressure $P_1$ and providing a heat interaction between the first mass of fluid and a second mass of matter in a second processing zone under a second pressure through a metallic heat conducting wall, the process requiring to maintain a substantial pressure differential between the two processing zones and to enhance both the rate of mass transfer associated with the gas-liquid interaction and the rate of transferring heat to supply the heat needed in the interaction or to remove the heat released in the interaction, characterized in:

(a) that the first processing zone is enclosed within a multitude of vertical processing conduits formed from two metal sheets, denoted respectively as A-sheet and B-sheet, by first forming strips of grooves on at least one sheet, say A-sheet, and then bonding the two metal sheets along the grooved regions to form a unitary assembly with an array of alternate and closely spaced strips of bonded regions and the multitude of void regions, the void regions becoming the vertical processing conduits, the bonded regions providing strength against the parting force developed by the pressure differential of the two processing zones, and that each processing conduit is provided with a nozzle means to apply a liquid film on the inner surface of the conduit, and that external fluid supply and fluid removal conduits are bonded along the upper and lower edges of said metal sheets;

(b) that the process comprises:

(1) a first step of applying a mass of liquid that is at least a portion of the first mass of fluid on the inner surface of each processing conduit to thereby form a falling liquid film on the surface, thereby providing a gas-liquid interface;

(2) a second step of transferring heat between the first mass of fluid in the first processing zone and the second mass of matter in the second processing zone through the metal wall and the falling liquid film;

(3) a third step of conducting the desired gas-liquid interaction on the gas-liquid interface provided by Step 1 upon meeting the heat effect requirement by the heat interaction provided by Step 2, the mass and heat transfer rates being enhanced by the formation of the falling liquid film inside of the processing conduits.

2. A process of claim 1, wherein the inner surface of each conduit is textured to enhance the wetting of the applied liquid on the inner surface of the processing conduits and thereby improve the mass and heat transfer rates.

3. A process of claim 1, wherein the inner surface is provided with small grooves running in the direction perpendicular to the direction of the processing conduits to enhance the wetting of the applied liquid on the inner surface and thereby improve the mass and heat transfer rates.

4. A process of claim 1, wherein the gas-liquid interaction in the first processing zone is chosen from (a) vaporization, (b) desorption and (c) endothermic chemical reaction, and the heat interaction is effected by heat transfer from the second processing zone to the first processing zone.

5. A process of claim 1, wherein the gas-liquid interaction in the first processing zone is chosen from (a) absorption and (b) exothermic chemical reaction, and the heat interaction is effected by heat transfer from the first processing zone to the second processing zone.

6. A process of claim 1, wherein the second mass of matter in the second processing zone also undergoes an interaction and the interaction in the first processing zone is chosen from (a) vaporization, (b) desorption, (c) endothermic chemical reaction and the interaction in the second processing zone is chosen from (a) condensation, (b) desublimation, (c) absorption, (d) exothermic chemical reaction and (e) cooling of a fluid, and the heat interaction is effected by a heat transfer from the second processing zone to the first processing zone.

7. A process of claim 1, wherein the second mass of matter in the second processing zone also undergoes an interaction, and the interaction in the first zone is chosen from (a) absorption and (b) exothermic chemical reaction, and the interaction in the second zone is chosen from (a) vaporization, (b) humidification, (c) desorption, (d) endothermic chemical reaction and (e) heating of a fluid and the heat interaction is effected by a heat transfer from the first processing zone to the second processing zone.

* * * * *